US009323346B2

(12) United States Patent
Lv et al.

(10) Patent No.: US 9,323,346 B2
(45) Date of Patent: Apr. 26, 2016

(54) ACCURATE 3D FINGER TRACKING WITH A SINGLE CAMERA

(71) Applicant: Futurewei Technologies, Inc., Plano, TX (US)

(72) Inventors: Fengjun Lv, Sunnyvale, CA (US); Fengqing Zhu, Sunnyvale, CA (US); Liang Zhou, Chengdu (CN); Pengwei Wang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 617 days.

(21) Appl. No.: 13/732,223

(22) Filed: Dec. 31, 2012

(65) Prior Publication Data

US 2014/0184745 A1 Jul. 3, 2014

(51) Int. Cl.
| | |
|---|---|
| *H04N 13/02* | (2006.01) |
| *G06F 3/033* | (2013.01) |
| *H04N 7/18* | (2006.01) |
| *H04N 5/225* | (2006.01) |
| *G06F 3/03* | (2006.01) |
| *G06F 3/00* | (2006.01) |
| *G06F 3/01* | (2006.01) |

(52) U.S. Cl.
CPC .............. *G06F 3/0304* (2013.01); *G06F 3/005* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 5,081,530 A | 1/1992 | Medina | |
| 5,383,013 A | 1/1995 | Cox | |
| 6,304,840 B1 | 10/2001 | Vance et al. | |
| 6,392,688 B1 | 5/2002 | Barman et al. | |
| 6,503,195 B1 | 1/2003 | Keller et al. | |
| 6,564,144 B1 | 5/2003 | Cherveny | |
| 6,917,033 B2 | 7/2005 | Hendriks et al. | |
| 7,358,738 B2 | 4/2008 | Overby et al. | |
| 7,372,977 B2 | 5/2008 | Fujimura et al. | |
| 7,720,259 B2 | 5/2010 | Gordon et al. | |
| 7,848,564 B2 | 12/2010 | Sullivan et al. | |
| 8,224,025 B2 | 7/2012 | Gordon | |
| 8,267,781 B2 | 9/2012 | Geiss | |
| 8,298,028 B2 | 10/2012 | Russell et al. | |
| 2009/0315989 A1* | 12/2009 | Adelson | 348/135 |
| 2010/0177164 A1 | 7/2010 | Zalevsky et al. | |
| 2011/0102319 A1* | 5/2011 | Lin et al. | 345/158 |
| 2012/0056982 A1 | 3/2012 | Katz et al. | |

OTHER PUBLICATIONS

Pamplona, V.F., et al., "The Image-Based Data Glove," Proceedings of X Symposium on Virtual Reality (SVR 2008), 2008, 8 pages.
Fofi, D., et al., "A Comparative Survey on Invisible Structured Light," Proceedings SPIE, Conference vol. 5303, Machine Vision Applications in Industrial Inspection XII, 90, May 3, 2004, 9 pages.

* cited by examiner

*Primary Examiner* — Behrooz Senfi
*Assistant Examiner* — Maryam Nasri
(74) *Attorney, Agent, or Firm* — Conley Rose, P.C.; Grant Rodolph; Adam J. Stegge

(57) ABSTRACT

An object tracking device includes a camera with a field of view oriented in a first direction and a mirror with a field of reflection oriented in a second direction. When an object is in a first region in the field of view of the electronic camera, the camera has a direct view of the object and a reflected view of the object from the mirror. A processor coupled with the camera is configured to receive a first image data set and a second image data set from the camera. The first image data set and the second image data set each include the direct view of the object and the reflected view of the object from the mirror.

18 Claims, 8 Drawing Sheets

ACCURATE 3D FINGER TRACKING WITH A SINGLE CAMERA

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Two-dimensional (2D) inputs have been used for many years to control a graphical user interface. The 2D input, for example the common computer mouse, has worked well with a user interface that was simplified to represent primarily 2D objects, such as text on a sheet of paper, drawings and photographs. Because of limited computing power and limited display capabilities, the computing industry largely accepted this limited input means.

Computing power has vastly increased over the years, and costs have dramatically decreased. Applications which operate in three dimensions (3D) are much more common. However, 3D inputs have lagged.

There are technologies to track 3D fingers and body parts from 2D images. For example, a "dataglove" or "cyberglove" system may use wired sensors such as magnetic or inertial tracking device to directly capture physical data such as bending of fingers. A motion capture system may use active markers such as light emitting diodes (LEDs) or passive markers coated with a retro-reflective material to reflect light so that body parts can be easily located in images from multiple 2D views and the 3D location can be computed. However, the requirement of attaching sensors and markers has slowed adoption of the above technologies.

Recently, depth sensors such as KINECT have emerged as a new user input device and been successfully used to track human body movement. However, due to the limitation of the underlying technologies (structure-light, time-of-flight, etc.), the resolution of the depth map is low, and the sensors have difficulty detecting close up objects. Therefore, such sensors are not suitable for tracking subtle movement of small objects such as fingers.

Traditional stereo vision systems have numerous limitations. One drawback is that two or more cameras are needed. For high resolution and high frame rate cameras, bandwidth also may pose a problem. To handle fast motion, stereo vision systems need synchronization hardware to synchronize images from different cameras. The two cameras usually need to be aligned to be coplanar and an image rectification step is required. Thus, stereo vision systems have to choose between small baseline (with small sensor size, large field of view (FOV) but large error in depth estimation) and large baseline (with small error in depth but large sensor size and small FOV).

SUMMARY

Embodiments in this disclosure relate to an object tracking device, comprising a camera with a field of view oriented in a first direction and a mirror with a field of reflection oriented in a second direction. When an object is in a first region in the field of view of the electronic camera, the camera has a direct view of the object and a reflected view of the object from the mirror. A processor coupled with the camera is configured to receive a first image data set and a second image data set from the camera. The first image data set and the second image data set each include the direct view of the object and the reflected view of the object from the mirror. The processor is configured to create a three dimensional representation of the object using at least the first image data set. The processor is configured to track motion in three dimensions of at least one location on the object using at least the second image data set.

Other embodiments in this disclosure relate to an object tracking apparatus comprising a processor configured to receive in a non-transitory memory at least a first image data set and a second image data set from only one camera. The first image data set includes a direct view of an object and a reflected view of the object from a mirror, and the second image data set includes the direct view of the object and the reflected view of the object from the mirror. The processor is configured to create a three dimensional representation of the object using the first image data set. The processor is further configured to track motion in three dimensions of at least one location on the object using the second image data set. The processor is configured to control a graphical user interface by inputting data derived from the tracking motion in three dimensions.

Still other embodiments in this disclosure relate to an object tracking method comprising orienting a field of view of an electronic camera in a first direction and orienting a field of reflection of a mirror in a second direction, such that when a human hand is in a first region in the field of view of the electronic camera, the camera has two views of the hand from two different angles. The method further includes receiving in a non-transitory memory at least first and second image data sets from the camera, wherein the first image data set includes a direct view of the hand and a reflected view of the hand from the mirror, and wherein the second image data set includes the direct view of the hand and the reflected view of the hand from the mirror. The method further includes creating a three dimensional representation of the hand using the first image data set by identifying in the first image data set a first location on the hand and a second location on the hand. Using a known distance between the camera and the mirror, and a known angle between the field of view of the camera and the field of reflection of the mirror, the method includes calculating a first ray from the camera to the first location, calculating a second ray from the camera to the second location, calculating a third ray from the mirror to the first location, and calculating a fourth ray from the mirror to the second location. The method includes estimating a first intersection of the first and third ray and estimating a second intersection of the second ray and the fourth ray. In addition, the method includes tracking motion in three dimensions of at least one location on the object using the second image data set by identifying in the first image data set the first location on the object and the second location on the object. Using the known distance between the camera and the mirror, and the known angle between the field of view of the camera and the field of reflection of the mirror, the method includes calculating a fifth ray from the camera to the first location, calculating a sixth ray from the camera to the second location, calculating a seventh ray from the mirror to the first location, and calculating an eighth ray from the mirror to the second location. The method includes estimating a third intersection of the fifth and seventh ray and estimating a fourth intersection of the sixth ray and the eighth ray, calculating a path between the first intersection and the third intersection, calculating a path between the second intersection and the fourth intersection. The method includes controlling a graphical user interface by inputting data derived from the tracking motion in three dimensions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

3D technologies are advancing at an unprecedented pace. A vast amount of 3D content, such as 3D images, videos and maps have been generated and are ready to be used by the general public. However, the computer mouse remains the most popular input device in a desktop environment due to its simplicity, accuracy, and low cost.

Unfortunately, the planar movement of a mouse makes it difficult or at least non-intuitive to interact with 3D objects. The recently popular touch screen interface has the same problem. In an ideal scenario, a user can move his/her fingers freely in a 3D space and a 3D interaction with the 3D object may be carried out accordingly. The accuracy should be high so that even subtle movement of the fingers can be captured and reflected in the interaction.

An ideal 3D input device should possess many qualities. An ideal 3D input device may be intuitive and non-intrusive, so that truly free-hand movement can be tracked without attaching any sensors or markers to a human body. An ideal 3D input device should also be highly accurate. An ideal 3D input device also may be low cost, meaning that the complexity of both hardware and software should be low for mass adoption and mobile device usage.

The disclosure relates to a low cost 3D finger tracking system that meets all the above requirements. The system may include a 3D vision system with a single camera and a mirror, which may reduce system complexity compared to a traditional stereo vision system. The system may use an infrared camera and infrared lights to detect fingertips or other objects such as pens, styluses, rods, etc. Also, the system may include an efficient algorithm to track multiple fingers in 3D.

Figure 1A:
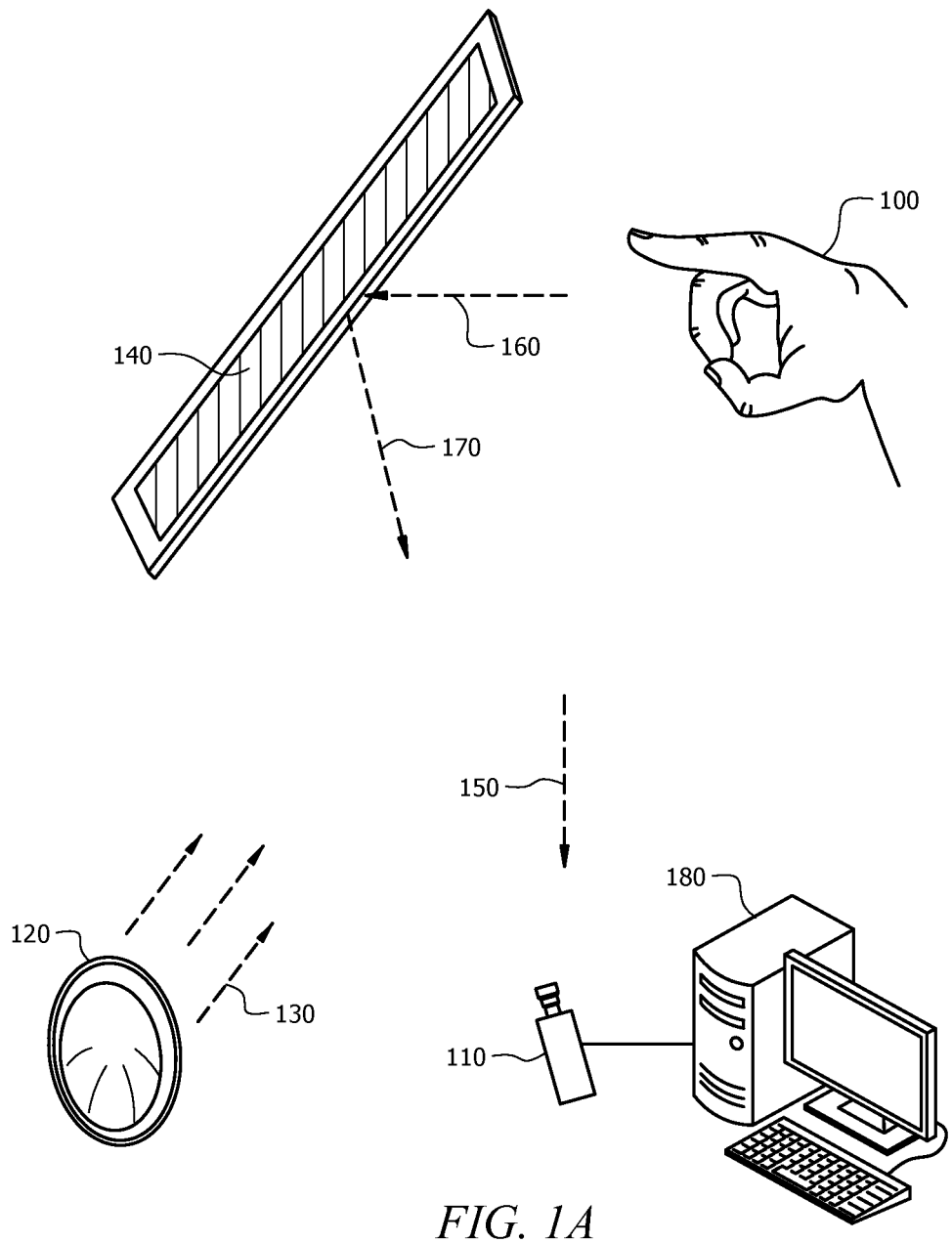
FIGS. 1A and 1B illustrate a camera and mirror arrangement to track object motion.
Figure 1B:
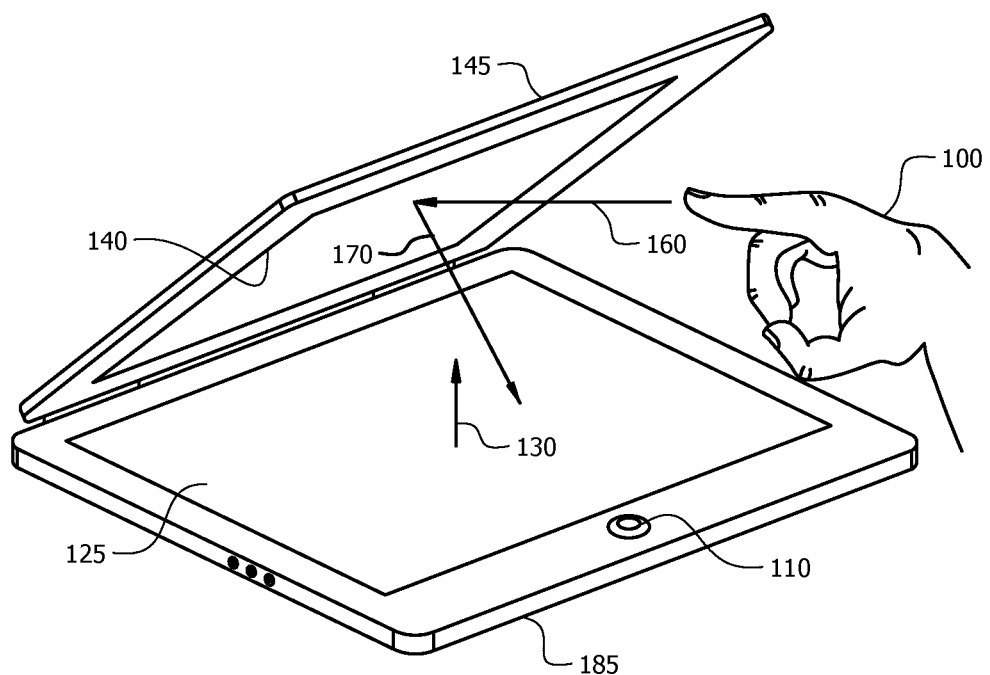

FIGS. 1A and 1B illustrate desktop and mobile versions, respectively, of the present 3D finger tracking system. Referring to FIG. 1A, the system may include a single camera 110, which may be an infrared (IR) camera, a light source 120 that may produce IR light 130, and a mirror 140. In alternative configurations, the light source 120 may produce visible, ultraviolet, or other types of light, or may simply reflect ambient light. Similarly, the camera 110 may also be configured to receive visible, ultraviolet, or other types of light. In some embodiments, the camera 110 may observe only infrared light. When the object 100 of interest, for example the hand in FIG. 1, appears within a region in the field of view of the camera 110, the object 100 may be illuminated by the IR light source 120 and generate an image in the camera 110. The camera 110 may be configured to generate a series of data sets corresponding to the sensed images of the object 100 at different points in time (e.g. video data). It will be appreciated that the object 100 need not be a hand; the object could be a stylus or any other suitable object.

The mirror 140 may have a field of reflection arranged to overlap with the field of view of the camera 110. In particular, the mirror 140 may be arranged such that when the object is in a region in front of the camera 110, the camera 110 may simultaneously have a direct view 150 of the object 100 and a reflected view 160, 170 of the object 100. The location and orientation of the mirror 140 may be adjusted in advance, so that the reflected image will also appear on the camera 110.

A scene captured by the IR camera 110 as a data set may be split into two regions: one region may correspond to the image captured in the direct view 150 of the camera; the other region may correspond to the reflected view 160, 170 from the mirror. Camera 110 may be connected to a computer 180 configured to process the data sets produced at different times. The computer 180 may be more fully described in FIG. 10.

FIG. 1B is substantially the same as FIG. 1A, with the exception that the computer 180 has been replaced with a mobile device 185. The mobile device 185 may be a laptop, notebook, or table computer, a cellular telephone, or any other suitable mobile device. In addition, the mirror 140 may be integrated into a cover 140 that is attached to the mobile device 185. Also, the mobile device 185 may comprise a screen 125 that acts as the light source 120. For example, the screen 125 may be configured to project IR light 130. Alternatively, the system may comprise a separate light source (not shown). The camera 110 may be integrated into mobile device 185 or may be a separate component in wireless or wired communication with the mobile device 185.

Figure 2:
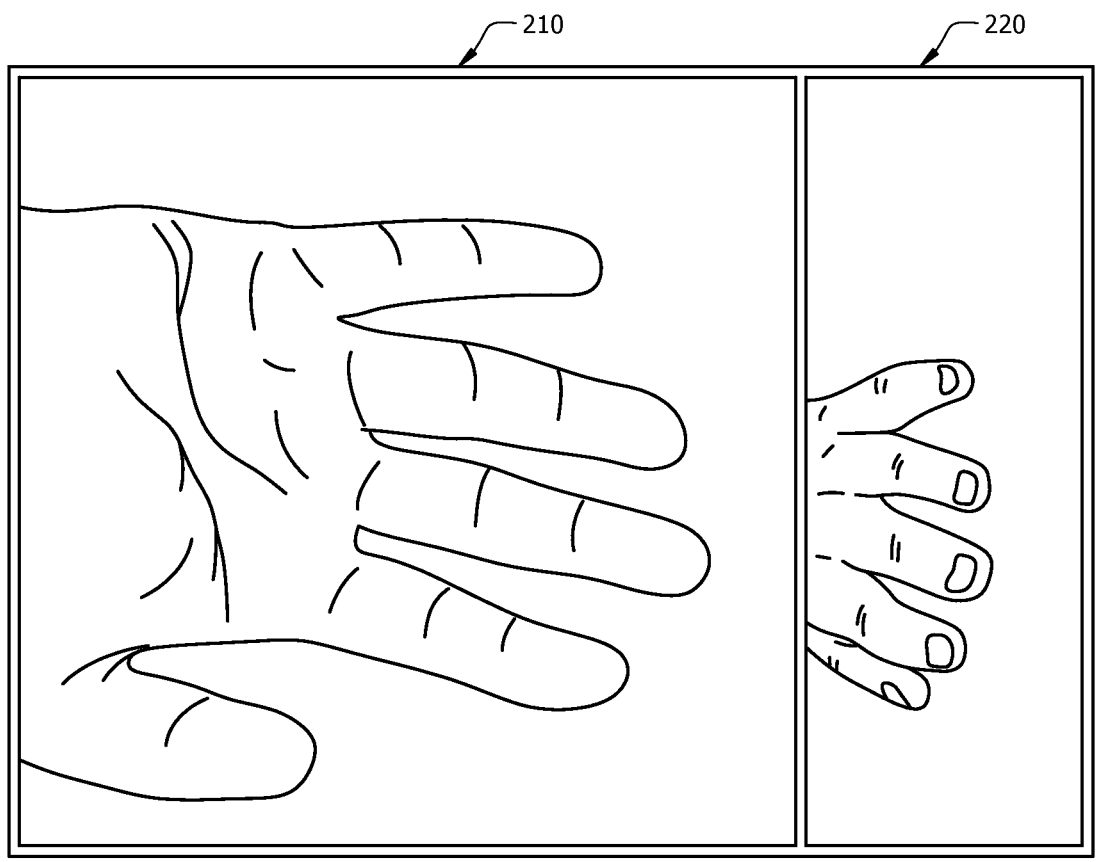
FIG. 2 illustrates a direct view and reflected view of a hand.

FIG. 2 shows one example of both images captured by a single IR camera. The single camera may effectively function as two cameras: a first camera may directly capture a direct view 210 of the object in FIG. 2, while a second virtual camera may capture the reflected view 220 of the object. Therefore, this single-camera setup may perform the same tasks that would normally require a two-camera setup.

Figure 3:
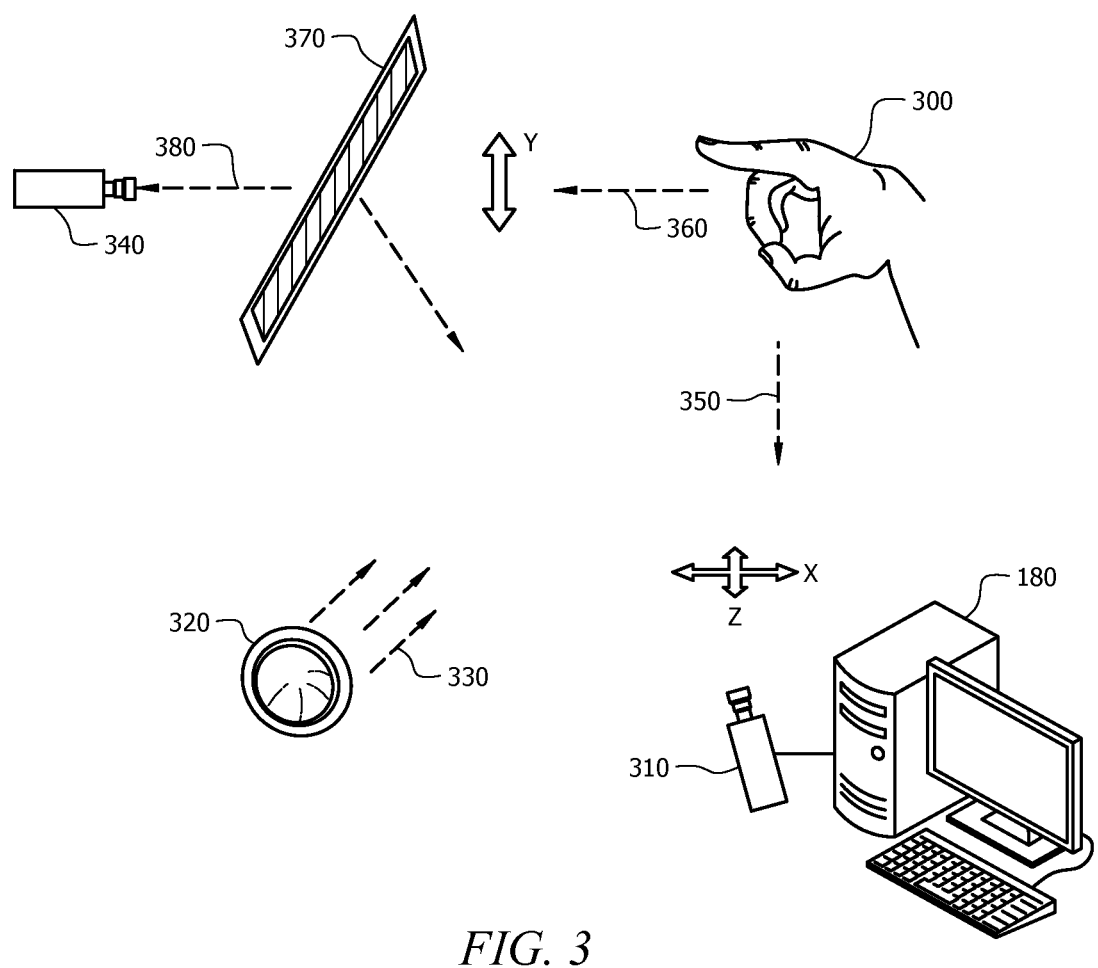
FIG. 3 illustrates a camera and a virtual camera to track object motion.

Turning to FIG. 3, a camera and a virtual camera to track object motion is illustrated. Object motion in x or z direction may be observed in single camera 310 in direct view 350. With an appropriate tilting angle, the mirror 370 may provide a complementary view 360, 380 for the same object 300. For example, a 45-degree tilting angle may be equivalent to having a virtual camera 340 which may allow for observing vertical object motion. Here, virtual camera 340 may be merely a reflection of camera 310 from the viewpoint of object 300; it is not a real, additional camera. In other words, view 380 is a virtual view. Note that a 45-degree tilt is an example and not a requirement. The actual translation and rotation between the real camera 310 and the virtual camera 340 may be computed by a camera calibration technique. The angle may depend on the expected location of the object and the location of the mirror with respect to the object and the camera. Using a complementary viewpoint from the mirror 370, 3D object motion may be estimated using a single camera. Light source 320 may produce light 330 at an infrared or other wavelength. Camera 310 may be connected to a computer 380 configured to capture images of the object as it moves in space as a plurality of data sets. The computer 380 may process the data sets produced at different times. The computer 380 may be more fully described in FIG. 9.

Figure 4A:
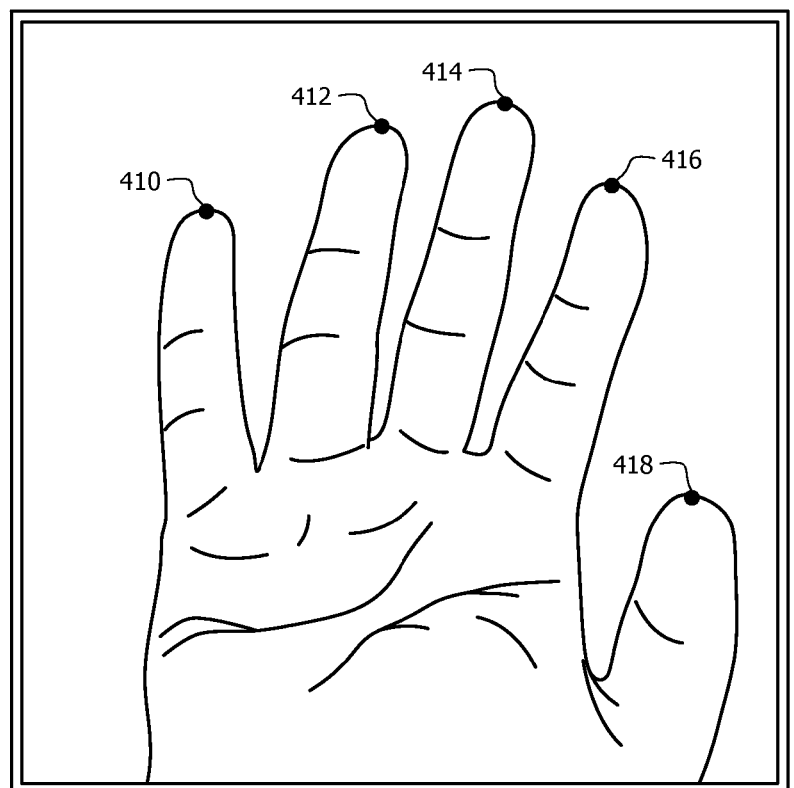
FIGS. 4A and 4B illustrates fingertips located in an image.
Figure 4B:
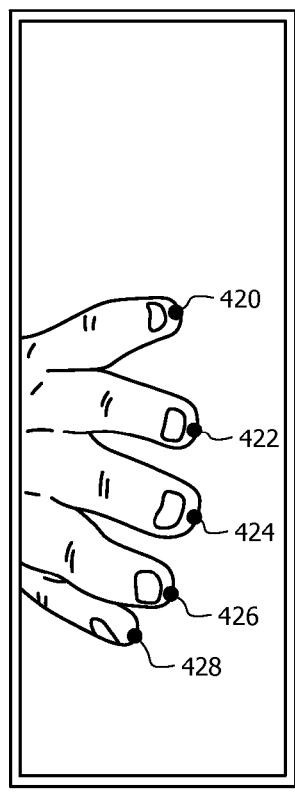

Using camera calibration tools, intrinsic parameters such as focal length, principal point, and lens distortion of the single camera 110 (including a virtual camera) may be estimated, as well as the extrinsic parameters (relative rotation and translation between the two cameras). In addition, the intensity of the IR light may be adjusted so that only close-up objects will be illuminated, not the background such as ceiling and wall of the room. Therefore, object boundary may be easily detected by searching for pixels with large contrast value. The fingertips may then be detected by searching for boundary points with large curvature value. FIG. 4A, which corresponds to view 210 in FIG. 2, shows the result of fingertip detection. For example, the camera and computer have located fingertips at 410, 412, 414, 416, and 418 in view 401. The corresponding fingertips have been located at 420, 422, 424, 426 and 428 in view 402 in FIG. 4B, which corresponds to view 220 in FIG. 2. False positive (non-fingertip is detected) and false negative (fingertip is not detected) may occur sometimes. Such problems may be solved in a tracking process.

Figure 5:
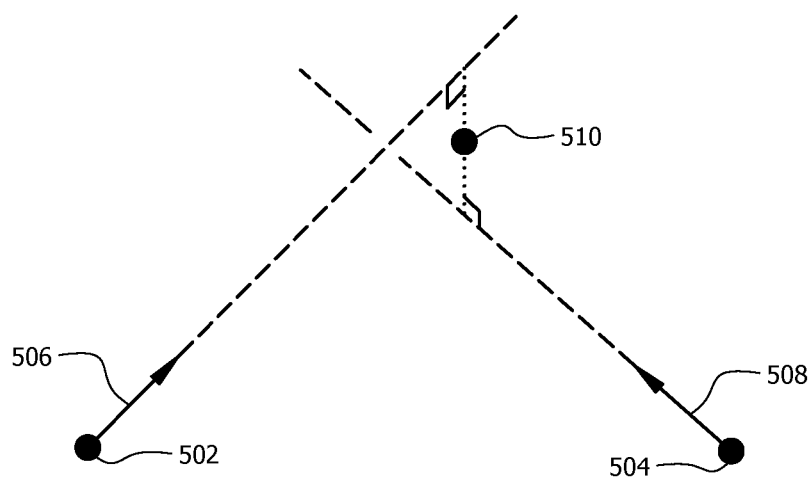
FIG. 5 illustrates a process for locating a single fingertip.

At each frame t, the finger detection module may provide a set of detected fingertips in each camera view. First, consider only the current frame t. The simplest case may be the single-finger gesture shown in FIG. 5 in which only one fingertip is detected on each view. The triangulation method may be used to compute the 3D location 510. In theory, location 510 may simply be the intersection of the two rays 506 and 508 that connect the camera optical center 502 (as well as the virtual camera optical center 504) and the detected fingertip in each view. In practice, the two rays may not intersect in 3D due to errors in projection and detection. In such cases, we find the midpoint 510 of the segment perpendicular to the two rays and use the length of the segment as the error measurement of such approximation, as illustrated in FIG. 5.

Figure 6A:
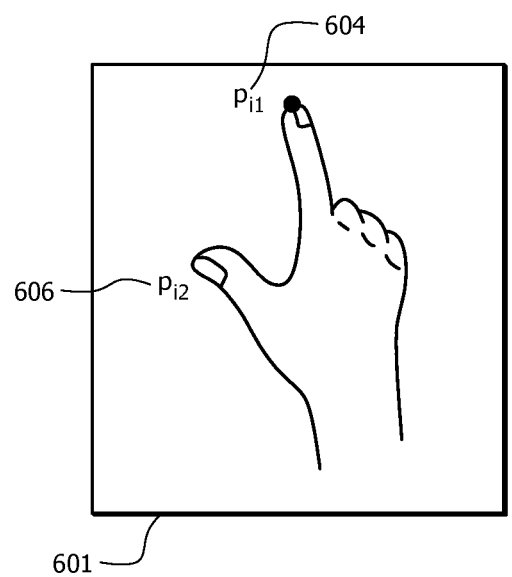
FIGS. 6A and 6B illustrate a process for locating multiple fingertips.
Figure 6B:
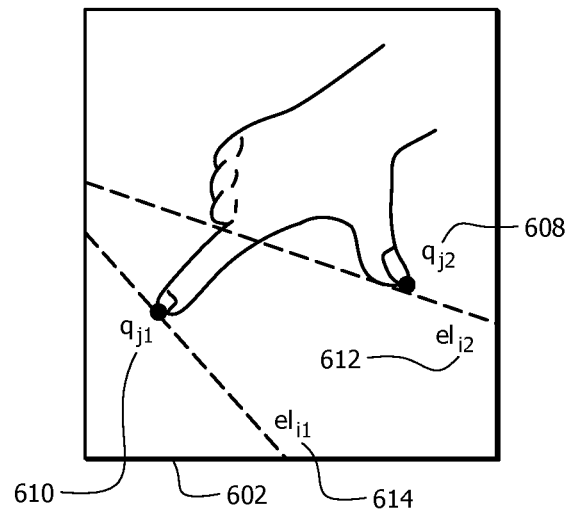

For multi-finger gestures, multiple fingertips may be detected on each view as shown in FIGS. 6A and 6B. Suppose there are m detected fingertips $p_i$ in view 601, i=1, ..., m, and n detected fingertips $q_j$ in view 602, j=1, ..., n. The goal is to establish a set of correspondences between $p_i$ 604, 606 and $q_j$ 608, 610. For each $p_i$ 604, 606 in view 601, there may be a corresponding epipolar line $el_i$ 612, 614 on view 602. The epipolar line may be the projection of the ray that connects the optical center of camera 110 and $p_i$ 604, 606. Correspondences may be established in terms of the smallest distance from $q_j$ 608, 610 to $el_i$ 612, 614. In FIG. 6, $q_{j1}$ 610 and $q_{j2}$ 608 may be the correspondence of $p_{i1}$ 604 and $p_{i2}$ 606, respectively. Triangulation method shown in FIG. 5 may be used to get the 3D location of each fingertip.

Figure 7A:
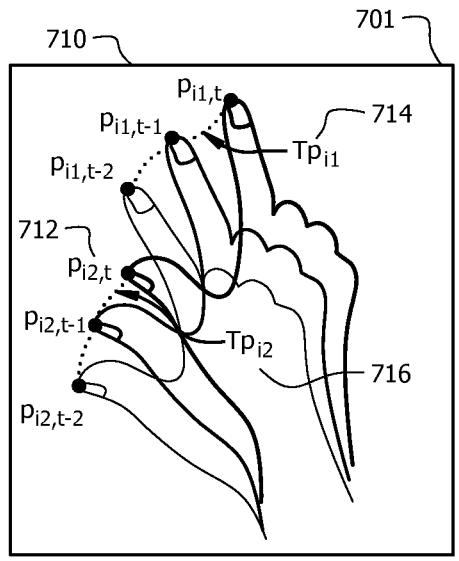
FIGS. 7A and 7B illustrate another process for tracking multiple fingertips.
Figure 7B:
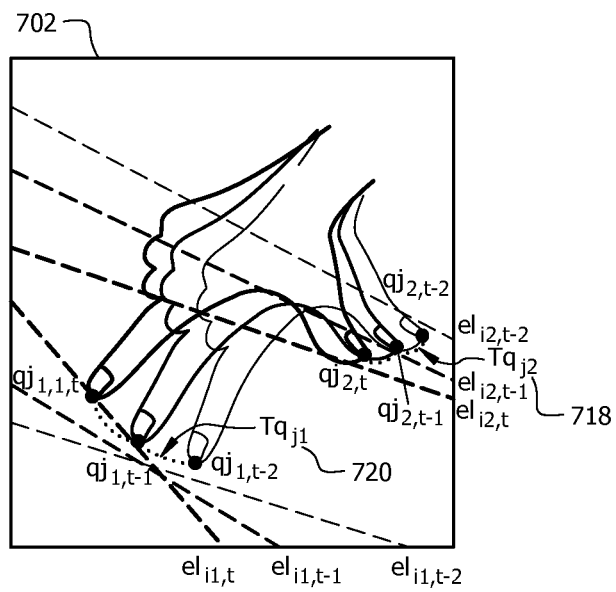

In practice, a one-to-one correspondence may not be found due to the following problems. Imperfect fingertip detection may give false positive (non-fingertip is detected) and false negative (fingertip is not detected) ambiguities due to the fact that in view 602 the same epipolar line 612, 614 may pass through multiple points or the same point may lie on multiple epipolar lines. Such problems may be solved when we look into the location history of each detected fingertip and correspondences are established based on tracks instead of individual points. Take FIGS. 7A and 7B for instance. Each view 701, 702 provides the position of each detected finger point 710, 712 not only at the current frame t, but also at the previous several frames t-1, t-2, ..., t-k. Since only short tracks may be considered (e.g. k is small), the 2D tracking may be reliably achieved by any popular image tracking methods such as Kalman filter, optical flow, etc.

The input for establishing correspondence may become a set of short tracks $Tp_i$ 714, 716 in view 701, i=1, ..., m, and another set of short tracks $Tq_j$ 718, 720 in view 702, j=1, ..., n. The goal may be to establish a set of correspondences between $Tp_i$ 714, 716 and $Tq_j$ 718, 720. Again, in view 702 the distance from $q_j$ to $el_i$ at each frame t, t-1, ... t-k it may be computed. It is possible that in some frames, some points are missing on either of the two tracks, which is acceptable because only frames that both tracks have points are considered. The distance between $Tp_i$ 714 and $Tq_j$ 718 (denoted as $D_{ij}$) may be the average of the above distances and correspondences are established in terms of the smallest $D_{ij}$. Then the triangulation method shown in FIG. 5 may be used to get the 3D location of each fingertip. By taking short tracks instead of individual points into account, the possibility of errors caused by the imperfect finger detection and the ambiguity mentioned above may be significantly reduced.

Figure 8:
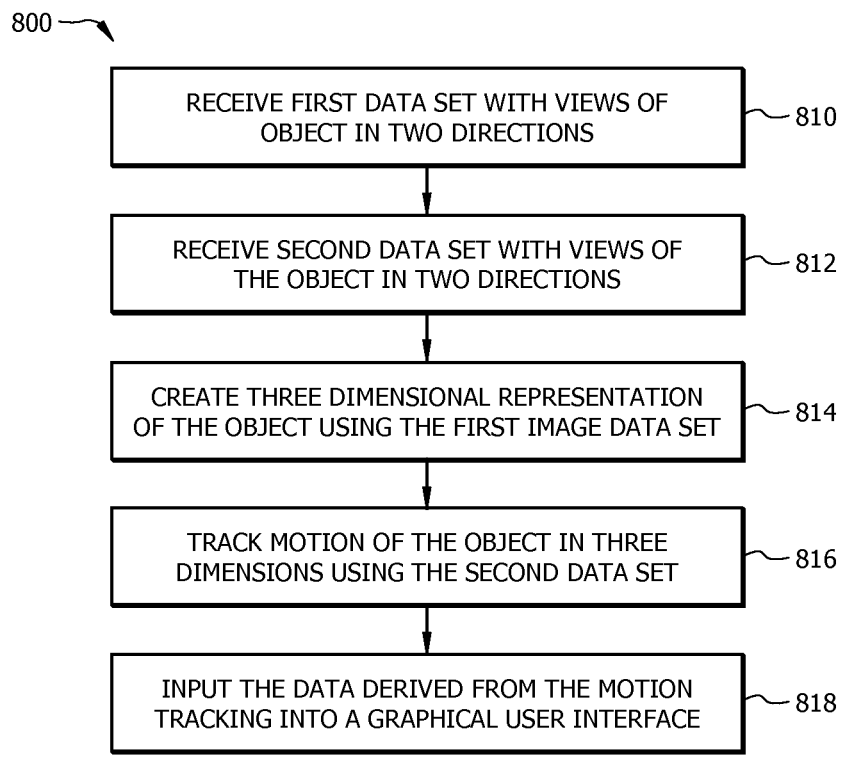
FIG. 8 illustrates a method for tracking fingertips.

Referring to FIG. 8, a method 800 for tracking objects is shown. The method 800 in FIG. 8 may be implemented by the computer whenever the camera needs to track the 3D motion of an object. An object tracking method 800 may include orienting the field of view of a single electronic camera in a first direction and orienting a field of reflection of a mirror in a second direction, such that when a human hand is in a first region in the field of view of the electronic camera, the camera has two views of the hand from two different angles. This orientation is shown in FIGS. 1 and 3.

Method 800 may begin with the reception (e.g. in a processor and/or non-transitory memory) of a first image data set at 810 and a second image data set at 812 from only one camera. Each image data set may be one or a plurality of images from the camera, and the differences between the first image data set and the second image data set may represent changes in object (e.g. hand) location over time. The camera may produce the first data set and the second data set based on images of infrared radiation. The first image data set and the second image data set each include a direct view of an object and a reflected view of the object from a mirror. The object may be, for example, a human hand.

The method 800 may be configured to create a three dimensional representation of the object using the first image data set at 814. This may be accomplished by identifying in the first image data set a first location on the hand and a second location on the hand. Using a known distance between the camera and the mirror, and a known angle between the field of view of the camera and the field of reflection of the mirror, the method 800 may include calculating a first ray from the camera to the first location, calculating a second ray from the camera to the second location, calculating a third ray from the mirror to the first location, and calculating a fourth ray from the mirror to the second location. The method 800 may include estimating a first intersection of the first and third ray and estimating a second intersection of the second ray and the fourth ray.

The method 800 is further configured to track motion in three dimensions of at least one location on the object using the second image data set at 816, for example using the methods described above in conjunction with FIGS. 5-7. In an embodiment, the method 800 may be configured to track motion in three dimensions at 816 by tracking locations on a human hand, wherein the at least one location on the object is a location on a fingertip of the human hand. The method 800 may be configured to attempt to locate the fingertip using the first data set by calculating an intersection and a closest approach of a first ray from the camera and a second ray from a mirror. If an intersection of the first ray and the second ray exists, the intersection is used as the location of the fingertip, and if no intersection between the first ray and the second ray exists, the location of the fingertip is estimated to be at the center of the shortest straight line connecting the first ray to the second ray, as shown in FIG. 5.

The method 800 may be configured to track motion in three dimensions including relative motion of a plurality of fingertips, such as discrete gestures, and interpret this relative motion as an input to a graphical user interface of a computing device. This may be accomplished by identifying in the first image data set the first location on the object and the second location on the object. Using the known distance between the camera and the mirror, and the known angle between the field of view of the camera and the field of reflection of the mirror, the method 800 may include calculating a fifth ray from the camera to the first location, calculating a sixth ray from the camera to the second location, calculating a seventh ray from the mirror to the first location, and calculating an eighth ray from the mirror to the second location. The method 800 includes estimating a third intersection of the fifth and seventh ray and estimating a fourth intersection of the sixth ray and the eighth ray, calculating a path between the first intersection and the third intersection, calculating a path between the second intersection and the fourth intersection.

In particular, the first location may be a first fingertip and the second location may be a second fingertip, and identifying in the first image data set the first fingertip on the hand and the second fingertip on the hand may include illuminating the hand with an infrared light source. At least two pixel regions with large contrast values may be located. The method 800 may include identifying a contiguous set of boundary points within each of the two pixel regions, as generally illustrated in FIG. 4. The method 800 may include locating boundary points with large curvature values within each of the two pixel regions, and setting the first fingertip location and the second fingertip location along the boundary points with large curvature values.

Figure 9:
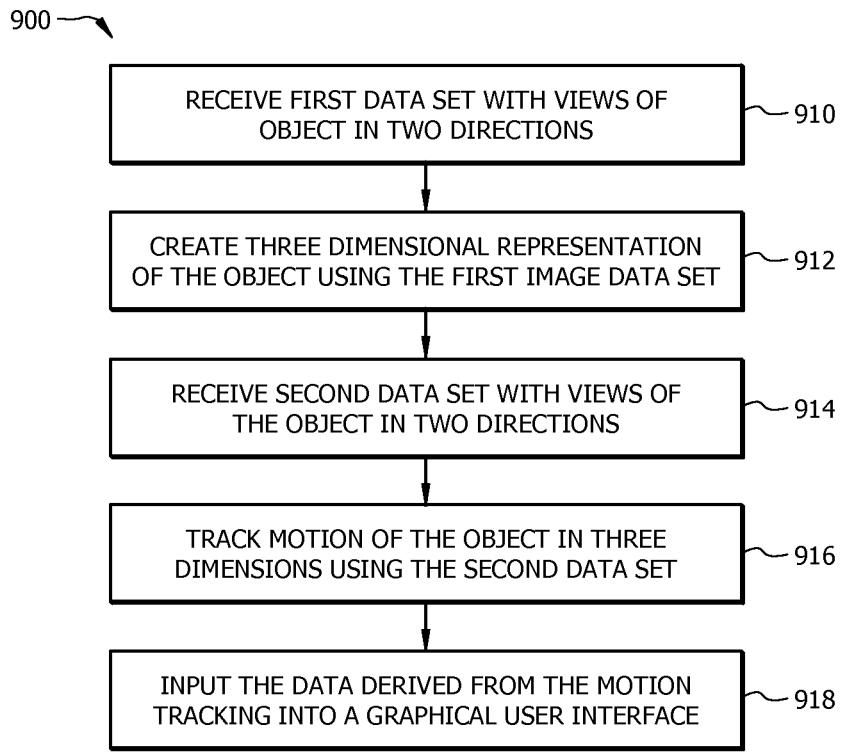
FIG. 9 illustrates another method for tracking fingertips.

The method 800 is configured to control a graphical user interface by inputting data derived from the tracking motion in three dimensions at 818. The method 800 may be configured to control a graphical user interface by at least controlling an operating system and a plurality of applications usable with the operating system. The method 800 may be configured to control a graphical user interface by providing inputs to open an application, close an application, suspend an application, and restart an application. FIG. 9 illustrates an alternative method 900 for tracking objects. In FIG. 9, the processor creates a three dimensional representation of the object after receiving the first image data set. The method begins with receiving a first data set with views of object in two directions 910. A three dimensional representation of the object using the first image data set may be created at 912. A second data set with views of the object in two directions may be received at 914. Motion of the object in three dimensions may be tracked using the second data set at 916. The data derived from the motion tracking may be input into a graphical user interface at 918.

In contrast to method 800, method 900 may receive both first and second data sets before the first three dimensional representation is created. Receiving the second data set while creating a three dimensional representation of the object using the first image data set is also contemplated. Data may be input into a graphical user interface before the second data set is received. Numerous other variations are possible. For example, an alternative method may use infrared camera and infrared lights to easily detect other objects besides a fingertip, such as pens, styluses, rods, etc.

Figure 10:
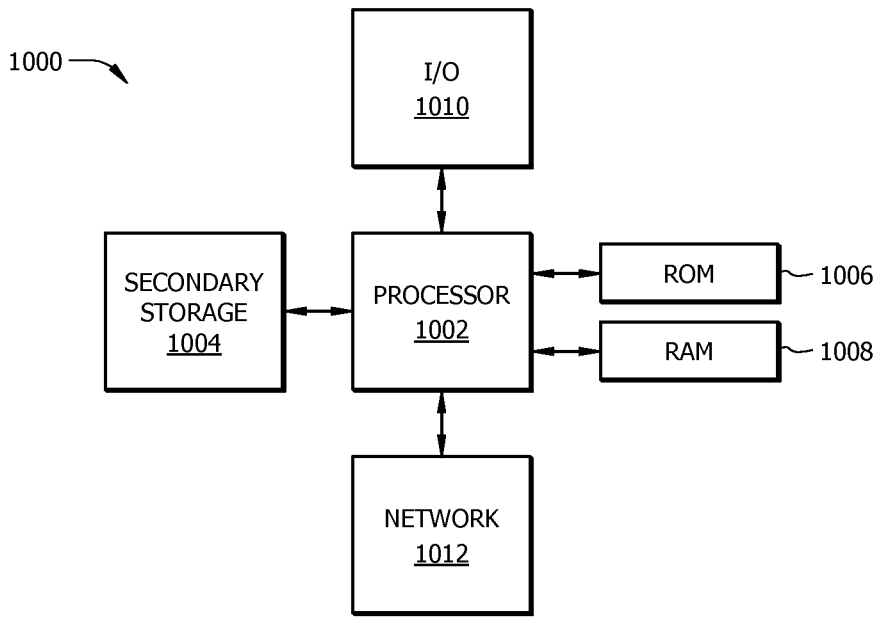
FIG. 10 illustrates a computer system that may be configured to implement the methods described herein.

The schemes described above may be implemented on any general-purpose computing system, such as a personal computer (PC) or mobile device (e.g. cellular telephone, or laptop, notebook, or table computer) with sufficient processing power, memory resources to handle the necessary workload placed upon it. FIG. 10 illustrates a schematic diagram of a general-purpose computing system 1000 suitable for implementing one or more embodiments of the methods disclosed herein. The general-purpose computing system 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. Although illustrated as a single processor, the processor 1002 is not so limited and may comprise multiple processors. The processor 1002 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1002 may be configured to implement any of the schemes described herein. The processor 1002 may be implemented using hardware, software, or both.

The secondary storage 1004 is typically comprised of one or more disk drives or tape drives and is used for non-volatile storage of data and as an over-flow data storage device if the RAM 1008 is not large enough to hold all working data. The secondary storage 1004 may be used to store programs that are loaded into the RAM 1008 when such programs are selected for execution. The ROM 1006 is used to store instructions and perhaps data that are read during program execution. The ROM 1006 is a non-volatile memory device that typically has a small memory capacity relative to the larger memory capacity of the secondary storage 1004. The RAM 1008 is used to store volatile data and perhaps to store instructions. Access to both the ROM 1006 and the RAM 1008 is typically faster than to the secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, e.g., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An object tracking device, comprising:
a camera with a field of view oriented in a first direction;
a mirror with a field of reflection oriented in a second direction, such that when an object is in a first region in the field of view of the camera, the camera has a direct view of the object and a reflected view of the object from the mirror; and
a processor configured to:
receive a first image data set and a second image data set from the camera, wherein the first image data set includes the direct view of the object and the reflected view of the object from the mirror, and wherein the second image data set includes the direct view of the object and the reflected view of the object from the mirror;
create a three dimensional representation of the object using at least the first image data set;
track motion in three dimensions by tracking allocation on a fingertip of a human hand using at least the second image data set; and
attempt to locate the fingertip using the first image data set by calculating at least one of an intersection and a closest approach of a first ray from the camera and a second ray from the mirror, and if an intersection of the first ray and the second ray exist, use the intersection as the location of the fingertip, and if no intersection between the first ray and the second ray exists, estimate the location of the fingertip to be at the center of the shortest straight line connecting the first ray to the second ray.

2. The object tracking device of claim 1, further comprising an infrared light source which projects infrared light into the first region.

3. The object tracking device of claim 2, wherein the camera produces the first image data set and second image data set using the infrared light.

4. The object tracking device of claim 1, wherein the processor is further configured to track relative motion of a plurality of the fingertips on the human hand.

5. The object tracking device of claim 4, wherein the processor is further configured to interpret a motion of the human hand in three dimensions as an input to a graphical user interface of a computing device.

6. The object tracking device of claim 5, wherein the processor is further configured to interpret discrete gestures of the human hand in three dimensions.

7. An object tracking apparatus, comprising:
a processor configured to:
receive at least a first image data set and a second image data set from a single camera, wherein the first image data set includes a direct view of an object and a reflected view of the object from a mirror, and wherein the second image data set includes the direct view of the object and the reflected view of the object from the mirror;
create a three dimensional representation of the object using the first image data set;
track motion in three dimensions by tracking a location on a fingertip of a human hand using the second image data set;
attempt to locate the fingertip using the first image data set by calculating at least one of an intersection and a closest approach of a first ray from the single camera and a second ray from the mirror, and if an intersection of the first ray and the second ray exist, use the intersection as the location of the fingertip, and if no intersection between the first ray and the second ray exists, estimate the location of the fingertip to be at the center of the shortest straight line connecting the first ray to the second ray; and
control a graphical user interface by inputting data derived from the tracking motion in three dimensions.

8. The apparatus of claim 7, wherein the processor is configured to control a graphical user interface by at least controlling an operating system and a plurality of applications usable with the operating system.

9. The apparatus of claim 8, wherein the processor is configured to control a graphical user interface by providing inputs to perform at least one of opening an application, closing an application, suspending an application, and restarting an application.

10. The apparatus of claim 7, wherein the processor is configured to receive the first image data set and the second data set produced by the single camera configured to produce data from infrared light.

11. The apparatus of claim 7, wherein the processor is configured to track motion in three dimensions including relative motion of a plurality of fingertips on the human hand.

12. The apparatus of claim 11, wherein the processor is configured to interpret the relative motion of the plurality of fingertips on the human hand as an input to a graphical user interface of a computing device.

13. The apparatus of claim 12, wherein the processor is further configured to interpret discrete gestures of the human hand in three dimensions.

14. The apparatus of claim 7, further comprising setting up the single camera and mirror to produce image data of the object by:
  orienting a field of view of the single camera in a first direction; and
  orienting a field of reflection of the mirror in a second direction, such that when an object is in a first region in the field of view of the single camera, the single camera has two views of the object from two different angles.

15. An object tracking method, comprising:
  orienting a field of view of a single camera in a first direction;
  orienting a field of reflection of a mirror in a second direction, such that when a human hand is in a first region in the field of view of the single camera, the single camera has two views of the hand from two different angles; and
  receiving in a non-transitory memory at least a first image data set and a second image data set from the single camera, wherein the first image data set includes a direct view of the hand and a reflected view of the hand from the mirror, and wherein the second image data set includes the direct view of the hand and the reflected view of the hand from the mirror;
  creating a three dimensional representation of the hand using the first image data set by identifying in the first image data set a first location on the hand and a second location on the hand, wherein creating the three dimensional representation of the hand using the first image data set comprises:
    calculating a first ray from the single camera to the first location;
    calculating a second ray from the single camera to the second location;
    calculating a third ray from the mirror to the first location;
    calculating a fourth ray from the mirror to the second location;
    estimating a first intersection of the first and third ray; and
    estimating a second intersection of the second ray and the fourth ray;
  tracking motion in three dimensions of at least one location on the object using the second image data set by identifying in the first image data set the first location on the object and the second location on the object; and
  controlling a graphical user interface by inputting data derived from tracking motion in the three dimensions.

16. The method according to claim 15, wherein creating the three dimensional representation of the hand using the first image data set includes using a known distance between the single camera and the mirror, and a known angle between the field of view of the single camera and the field of reflection of the mirror, and wherein tracking motion in three dimensions of the at least one location on the object includes using the known distance between the single camera and the mirror, and the known angle between the field of view of the single camera and the field of reflection of the mirror.

17. The method according to claim 16, wherein creating the three dimensional representation of the hand using the first image data set further includes calculating a fifth ray from the single camera to the first location, calculating a sixth ray from the single camera to the second location, calculating a seventh ray from the mirror to the first location, and calculating an eighth ray from the mirror to the second location, estimating a third intersection of the fifth and seventh ray and estimating a fourth intersection of the sixth ray and the eighth ray, calculating a path between the first intersection and the third intersection, calculating a path between the second intersection and the fourth intersection.

18. The method according to claim 15, wherein the first location is a first fingertip and the second location is a second fingertip, and identifying in the first image data set the first fingertip on the hand and the second fingertip on the hand further comprises:
  illuminating the hand with an infrared light source;
  locating at least two pixel regions with large contrast values;
  identifying a contiguous set of boundary points within each of the two pixel regions;
  locating boundary points with large curvature values within each of the two pixel regions; and
  setting the first fingertip location and the second fingertip location along the boundary points with large curvature values.

* * * * *